US009880808B2

(12) United States Patent
Park et al.

(10) Patent No.: US 9,880,808 B2
(45) Date of Patent: Jan. 30, 2018

(54) DISPLAY APPARATUS AND METHOD OF CONTROLLING A DISPLAY APPARATUS IN A VOICE RECOGNITION SYSTEM

(71) Applicant: SAMSUNG ELECTRONICS CO., LTD., Suwon-si (KR)

(72) Inventors: Eun-hee Park, Guri-si (KR); Sang-jin Han, Gunpo-si (KR); Jae-kwon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/149,487

(22) Filed: Jan. 7, 2014

(65) Prior Publication Data

US 2014/0191949 A1    Jul. 10, 2014

(30) Foreign Application Priority Data

Jan. 7, 2013    (KR) .................. 10-2013-0001807

(51) Int. Cl.
*G09G 1/00* (2006.01)
*G06F 3/16* (2006.01)
(Continued)

(52) U.S. Cl.
CPC ............. *G06F 3/167* (2013.01); *G10L 15/22* (2013.01); *H04N 21/42203* (2013.01);
(Continued)

(58) Field of Classification Search
CPC  H04M 2250/74; G06F 3/16167; G10L 15/21; G10L 15/22; G10L 15/225
(Continued)

(56) References Cited

U.S. PATENT DOCUMENTS 6,751,594 B1    6/2004 Diehl et al.
6,853,962 B2 *  2/2005 Appleby ................. 703/2
(Continued)

FOREIGN PATENT DOCUMENTS

CN    1261178 A    7/2000
CN    1633679 A    6/2005
(Continued)

OTHER PUBLICATIONS

International Search Report dated Apr. 28, 2014 issued by the International Searching Authority in counterpart International Application No. PCT/KR2014/000119.
(Continued)

*Primary Examiner* — Michael Faragalla
(74) *Attorney, Agent, or Firm* — Sughrue Mion, PLLC

(57) ABSTRACT

A display method and apparatus for controlling a voice recognition system are provided. When a user's voice for controlling the display apparatus is input, the method of controlling the display apparatus transmits the voice's user to the interactive server, while determining whether the user's voice is a pre-stored command in the display apparatus, and in response to the user's voice not being a pre-stored command in the display apparatus and the control information which corresponds to the user's voice and first guide information guiding the pre-stored command capable of the same function as the user's voice are transmitted from the interactive server, the method performs the function of the display apparatus, according to the control information transmitted from the interactive server, and displays the first guide information.

20 Claims, 11 Drawing Sheets

(51) Int. Cl.
    *G10L 15/22* (2006.01)
    *H04N 21/422* (2011.01)
    *H04N 21/472* (2011.01)
    *G10L 15/30* (2013.01)
(52) U.S. Cl.
    CPC .......... *H04N 21/472* (2013.01); *G10L 15/30* (2013.01); *G10L 2015/223* (2013.01)
(58) Field of Classification Search
    USPC .................... 704/254, 270, 275, 271, 276
    See application file for complete search history.

(56) References Cited

U.S. PATENT DOCUMENTS

| | | | |
|---|---|---|---|
| 6,898,567 B2 | 5/2005 | Balasuriya | |
| 6,937,984 B1 | 8/2005 | Morgan et al. | |
| 6,944,593 B2 | 9/2005 | Kuzunuki et al. | |
| 7,058,579 B2 * | 6/2006 | Kuzunuki | G10L 15/22 704/270.1 |
| 7,206,747 B1 * | 4/2007 | Morgan | 704/251 |
| 7,254,543 B2 * | 8/2007 | Ibaraki | H04N 5/44513 348/E5.102 |
| 7,299,186 B2 | 11/2007 | Kuzunuki et al. | |
| 7,933,777 B2 * | 4/2011 | Koll | G10L 15/32 370/353 |
| 7,983,921 B2 | 7/2011 | Hirota et al. | |
| 2003/0074199 A1 | 4/2003 | Kuzunuki et al. | |
| 2003/0074200 A1 | 4/2003 | Kuzunuki et al. | |
| 2003/0139924 A1 | 7/2003 | Balasuriya | |
| 2004/0199394 A1 | 10/2004 | Kuzunuki et al. | |
| 2005/0149332 A1 | 7/2005 | Kuzunuki et al. | |
| 2009/0271200 A1 * | 10/2009 | Mishra | G10L 15/30 704/254 |
| 2012/0052909 A1 | 3/2012 | Joh et al. | |
| 2012/0173244 A1 | 7/2012 | Kwak et al. | |
| 2012/0265536 A1 * | 10/2012 | Paik | G10L 15/22 704/270 |

FOREIGN PATENT DOCUMENTS

| | | |
|---|---|---|
| CN | 102737632 A | 10/2012 |
| EP | 1020789 A1 | 7/2000 |
| JP | 2003-115929 A | 4/2003 |
| JP | 2009-109586 A | 5/2009 |
| KR | 1020000028191 A | 5/2000 |
| KR | 10-2005-0015585 A | 2/2005 |

OTHER PUBLICATIONS

Written Opinion dated Apr. 28, 2014 issued by the International Searching Authority in counterpart International Application No. PCT/KR2014/000119.

Communication dated Jul. 20, 2016, issued by the European Patent Office in counterpart European Application No. 14735227.2.

Communication dated Aug. 11, 2016, issued by the Korean Intellectual Property Office in counterpart Korean application No. 10-2013-0001807.

Communication dated Dec. 9, 2016, issued by the Mexican Patent Office dated in counterpart Mexican application No. MX/a/2015/008747.

Communication issued by the Korean Intellectual Property Office dated Jul. 1, 2017 in counterpart Korean Patent Application No. 10-2017-0059480.

Communication issued by the Mexican Patent Office dated Jul. 6, 2017 in counterpart Mexican Patent Application No. MX/a/2015/008747.

Communication issued by the European Patent Office dated Aug. 2, 2017 in counterpart European Patent Application No. 14735227.2.

Communication dated Oct. 31, 2017, issued by the State Intellectual Property Office of the People's Republic of China in counterpart Chinese Patent Application No. 201480012854.X.

\* cited by examiner

US 9,880,808 B2

DISPLAY APPARATUS AND METHOD OF CONTROLLING A DISPLAY APPARATUS IN A VOICE RECOGNITION SYSTEM

CROSS-REFERENCE TO RELATED APPLICATIONS

This application claims priority under 35 U.S.C. § 119(a) from Korean Patent Application No. 2013-1807, filed on Jan. 7, 2013, in the Korean Intellectual Property Office, the contents of which are incorporated herein by reference, in its entirety.

BACKGROUND

1. Field

The present disclosure relates to a display apparatus and a method of controlling a display apparatus in a voice recognition system. More particularly, the exemplary embodiments relate to a display apparatus that controls functions of the display apparatus according to user's voice and a method of controlling a display apparatus in a voice recognition system.

2. Description of the Related Art

In general, a display apparatuses that can recognize voice are divided into embedded apparatuses and interactive apparatuses.

A display apparatus according to an embedded scheme can only recognize a limited number of voices of users. In particular, a display apparatus according to an embedded scheme can perform functions which correspond to a user's voice only when a user's voice corresponding to pre-stored commands is input. The display apparatus according to an embedded scheme has an advantage of rapidly performing a function which corresponds to an input user's voice; whereas the apparatus has a disadvantage of having a limited ability of recognizing a user's voice since the apparatus only recognizes a user's voice which corresponds to a pre-stored command.

A display apparatus according to an interactive scheme recognizes an intention of the user by recognizing various user's voices through an external interactive server and performs an operation which is suitable for the intention of the recognized user. When a user's voice is input, the display apparatus according to an interactive scheme receives from the interactive server control information or response information (for example, contents search information) which corresponds to the user's voice and performs a function which corresponds to the user's voice, based on the control information or the response information. Compared to the display apparatus, according to an embedded scheme, the display apparatus according to an interactive scheme has an advantage of recognizing various kinds of user's speech and performing an operation which corresponds to the recognized user's speech, whereas it has a disadvantage of having a slow response speed compared to the display apparatus according to an embedded scheme since the display apparatus according to an interactive scheme performs a function which corresponds to the user's voice by using an interactive server.

In particular, a display apparatus using both schemes has been developed. However, even though the two schemes are used, if a user does not speak the command embedded in the display apparatus but rather speaks a similar command as the embedded command, the display apparatus recognizes the user's voice based on an interactive scheme and performs a function which corresponds to the user's voice. For example, in response to the command embedded to perform the volume up function of the display apparatus being "volume up," but a user speaks "please volume up," the display apparatus should use an interactive scheme having a slow response speed, not an embedded scheme having a fast response speed, to perform the "volume up" function.

In other words, when a user does not know which of the two recognition schemes allows a voice recognition to be more rapidly performed, the workload of a display apparatus is unnecessarily increased and a response to a user's voice becomes slowed.

SUMMARY

The present disclosure provides a display apparatus that provides voice guide information to a user so as to control the function of the display apparatus in rapid response to a user's voice being input; a method of controlling the display apparatus, and a method of controlling a voice recognition system.

According to an aspect of an exemplary embodiment, a method of controlling a display apparatus is provided. The method may include: receiving a user's voice for controlling the display apparatus; determining whether the user's voice is a command pre-stored in the display apparatus and transmitting the user's voice to an interactive server; and performing a function of the display apparatus based on control information transmitted from the interactive server and displaying first guide information, when the control information which corresponds to the user's voice and the first guide information are transmitted from the interactive server in the case that the user's voice is not the command pre-stored in the display apparatus, the first guide information guiding the pre-stored command capable of performing the same function as the user's voice.

The interactive server may search control information which corresponds to the user's voice; determine whether there is a command pre-stored in the display apparatus that can perform the same function as the control information while searching the control information which corresponds to the user's voice; and when there is a pre-stored command in the display apparatus that can perform the same function as the control information, generating first guide information which guides the pre-stored command and transmits to the display apparatus the guide information with the control information.

The method may further include: when the user's voice is a pre-stored command, searching control information which corresponds to the pre-stored command; and preferentially performing a function of the display apparatus based on the searched control information.

The method may further include: when the user's voice is a pre-stored command and the user's voice is a command for controlling the function of the display apparatus having a plurality of hierarchy structures, displaying second guide information which guides an interactive command capable of performing the same function as the user's voice.

The interactive server may include a first interactive server which converts the user's voice into text information; and a second interactive server which generates control information and first guide information based on the text information.

According to an aspect of an exemplary embodiment, there is provided a display apparatus. The apparatus may include: a voice input configured to receive a user's voice for controlling the display apparatus; a communicator configured to perform a communication with an interactive server;

a storage configured to match a command and control information to store the same; a display; and a controller configured to transmit the user's voice via the communicator to the interactive server while determining whether the user's voice input via the user input is a command pre-stored in the storage, and in the situation that the user's voice is not a command pre-stored in the storage and when control information which corresponds to the user's voice and first guide information are transmitted from the interactive server, the first guide information guiding the pre-stored command which is capable of performing the same function as the user's voice, the controller is configured to perform a function of the display apparatus based on the control information transmitted from the interactive server and to control the display in order to display the first guide information.

The interactive server may search control information which corresponds to the user's voice; determine whether there is a command pre-stored in the display apparatus that can perform the same function as the control information while searching the control information which corresponds to the user's voice; and when there is a pre-stored command in the display apparatus that can perform the same function as the control information, generate first guide information which guides the pre-stored command and transmits to the display apparatus the guide information with the control information.

The controller may search control information which corresponds to the user's voice which is pre-stored in the storage when the user's voice is a pre-stored command in the storage, and preferentially performs a function of the display apparatus based on the searched control information.

The controller may control the display to display second guide information which guides an interactive command that is capable of performing the same function as the user's voice, when the user's voice is a pre-stored command and the user's voice is a command which controls the function of the display apparatus having a plurality of hierarchy structures.

The interactive server may include a first interactive server which converts the user's voice into text information; and a second interactive server generating control information and first guide information based on the text information, and the controller may transmit the user's voice to the first interactive server and control the communicator to transmit to the second interactive server the text information which was transmitted from the first interactive server.

According to an aspect of an exemplary embodiment, there is provided a method of controlling a voice recognition system comprising an interactive server and a display apparatus. The method may include: receiving, by the display apparatus, a user's voice; transmitting, by the display apparatus, the user's voice via the communicator to the interactive server while determining whether the user's voice input via the user input is a command pre-stored in the storage; transmitting, by the interactive server, information to the display apparatus by generating at least one of control information which corresponds to the user's voice and first guide information, the first guide information guiding a command pre-stored in the display apparatus that can perform the same function as the control information; and when the user's voice is not a command pre-stored in the display apparatus, performing, by the display apparatus, a function of the display apparatus based on control information transmitted from the interactive server and displaying the first guide information.

The method may further include: when the user's voice is a command pre-stored in the display apparatus, searching, by the display apparatus, control information which corresponds to the user's voice and performing a function of the display apparatus based on the searched control information.

The method may further include: when the user's voice is a pre-stored command and the user's voice is a command for controlling the function of the display apparatus having a plurality of hierarchy structures, displaying, by the display apparatus, second guide information which guides an interactive command capable of performing the same function as the user's voice.

The interactive server may include a first interactive server which converts the user's voice into text information; and a second interactive server which generates control information and first guide information based on the text information, and the transmitting the user's voice may include: converting, by the display apparatus, the user's voice into a digital signal; transmitting, by the display apparatus, the digital signal to the first interactive server; generating, by the first interactive server, text information which corresponds to the digital signal and transmitting the information to the display apparatus; and the display apparatus transmitting the text information to the second interactive server.

The transmitting information may further includes: when the user's voice is not a dialog pattern pre-stored in the interactive server, performing, by the interactive server, the same function as the user's voice, generating third guide information and transmitting the information to the display apparatus, the third guide information guide guiding a user's voice according to the dialog pattern stored in the interactive server; and displaying, by the display apparatus, the third guide information.

The transmitting information may further include: when the user's voice is an interactive voice to which the interactive server cannot respond, generating, by the interactive server, fourth guide information by extracting a keyword from the user's voice and transmitting the information to the display apparatus, the fourth guide information guiding information related to the keyword; and displaying, by the display apparatus, the fourth guide information.

An aspect of an exemplary embodiment may provide a display apparatus including: a communicator configured to communicate with an interactive server; a storage configured to match a command and control information in order to store the same; and a controller configured to transmit the user's voice via the communicator to the interactive server while determining whether the user's voice input via a user input is a pre-stored command, when the user's voice is not a pre-stored command and when control information which corresponds to the user's voice and first guide information are transmitted from the interactive server, the first guide information guiding the pre-stored command capable of performing the same function as the user's voice, the controller being configured to perform a function of the display apparatus based on the control information transmitted from the interactive server and configured to control a display of the first guide information.

A voice input may be provided to receive a user's voice to be used to control the display apparatus.

A display may be provided to display the first guide information. Additionally, the controller may search control information which corresponds to the user's voice pre-stored in the storage when the user's voice is a command pre-stored in the storage, and performs a function of the display apparatus based on the searched control information.

Additional aspects and utilities of the disclosure will be set forth in part in the description which follows and, in part, will be obvious from the description, or may be learned by practice of the exemplary embodiments.

BRIEF DESCRIPTION OF THE DRAWINGS

These and/or other aspects and utilities of the present disclosure will become apparent and more readily appreciated from the following description of the embodiments, taken in conjunction with the accompanying drawings of which.

DETAILED DESCRIPTION OF THE PREFERRED EMBODIMENTS

Figure 1:
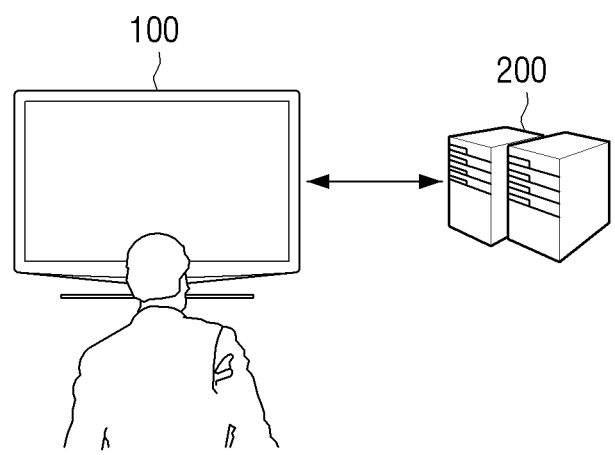
FIG. 1 is a view of a voice recognition system, according to an exemplary embodiment.

Reference will now be made in detail to the exemplary embodiments, examples of which are illustrated in the accompanying drawings, wherein like reference numerals refer to the like elements throughout. The exemplary embodiments are described below in order to explain the present disclosure by referring to the figures.

FIG. 1 is a view of a voice recognition system according to an exemplary embodiment. As described in FIG. 1, a voice recognition system 10 comprises a display apparatus 100 and an interactive server 200. The display apparatus may be implemented as a smart TV, but this is merely an example. The display apparatus may be implemented as various electronic devices such as smart phones, desk top PCs, tablet PCs, lap top PCs and navigation devices.

A display apparatus 100 may recognize a user's voice and may perform a function of the display apparatus 100 based on a recognition of a user's voice. In particular, a display apparatus 100 may perform a function of a display apparatus 100 according to a user's voice by using an embedded scheme and an interactive scheme.

In particular, the display apparatus 100 recognizes a user's voice, matches a command for performing a function of the display apparatus 100 to control information and stores the same. For example, the display apparatus 100 may match the command "volume up" to the control information "increase an audio volume level to a predetermined level" and may store the same.

In response to a user's voice being input to the display apparatus 100, the display apparatus 100 may transmit the user's voice to the external interactive server 200 and may simultaneously determine whether the user's voice is a pre-stored command in the display apparatus 100.

The interactive server 200 may search, based on a database, control information which corresponds to the user's voice received from the display apparatus 100. For example, in response to the received user's voice being "please volume up," the interactive server 200 may search control information "increase a volume level of an audio output from the display apparatus 100 to a predetermined level (e.g. level 3)" based on the keywords "volume" and "up."

The interactive server 200 may determine whether there is a pre-stored command in the display apparatus 100 that can perform the same function as control information while searching control information which corresponds to the user's voice. In response to there being a pre-stored command in the display apparatus 100 that can perform the same function as control information, the interactive server 200 may generate first guide information which guides the pre-stored command in the display apparatus 100 and transmit the first guide information with the control information to the display apparatus 100. For example, the interactive server 200 may search a pre-stored command in the display apparatus 100 that can perform the same function as the received user's voice "please volume up" and may generate first guide information which guides to a user the searched command "volume up". The interactive server 200 may transmit the first guide information with the control information to increase the audio volume level of the display apparatus 100 to a predetermined level. The display apparatus 100 induces a user to speak the pre-stored command in the display apparatus 100 through the first guide information so that the display apparatus 100 may respond more immediately to the user's voice.

In response the user's voice not being a pre-stored command in the display apparatus 100, the display apparatus 100 may perform a function of the display apparatus 100 based on control information transmitted from the interactive server 200. For example, in response to a pre-stored command being "volume up" but a user speaks "please volume up," the display apparatus 100 may perform a function of increasing the volume level of an audio output from the display apparatus 100 to a predetermined level based on the control information transmitted from the interactive server 200. The display apparatus 100 may display first guide information transmitted from the interactive server 200.

In response to the user's voice being a command which is pre-stored in the display apparatus 100, the display apparatus 100 may search control information which corresponds to the pre-stored command, regardless of the control information transmitted from the interactive server 200. The display apparatus 100 may perform a function of the display apparatus 100 based on the control information. For example, in response to a user's voice stating "volume up," which is a pre-stored command in the display apparatus 100, is input, the display apparatus 100 searches control information which corresponds to the pre-stored command and may perform the function of increasing the audio level of the display apparatus 100 to a predetermined level based on the searched control information.

In particular, in response to the user's voice being a pre-stored command in the display apparatus 100, but it is a command for performing the function of a display apparatus having a plurality of hierarchy structures, the display apparatus 100 may display second guide information which guides an interactive command that can perform the same function as the user's voice. This is to more simply control the function of the display apparatus 100 by a single interactive command because it is required to input the user's voice several times in response to the function of the display apparatus having a plurality of hierarchy structures being performed based on the pre-stored command.

As above, the interactive server provides guide information which guides a more effective and rapid voice recognition method to a user so that a user can more effectively and rapidly control the display apparatus 100.

In the above embodiment, it has been explained that the user's voice is transmitted to the interactive server 200 regardless of whether the user's voice is a pre-stored command. However, this is merely one example, and the user's voice may be transmitted to the interactive server 200 only in response to the user's voice not being a pre-stored command.

Figure 2:
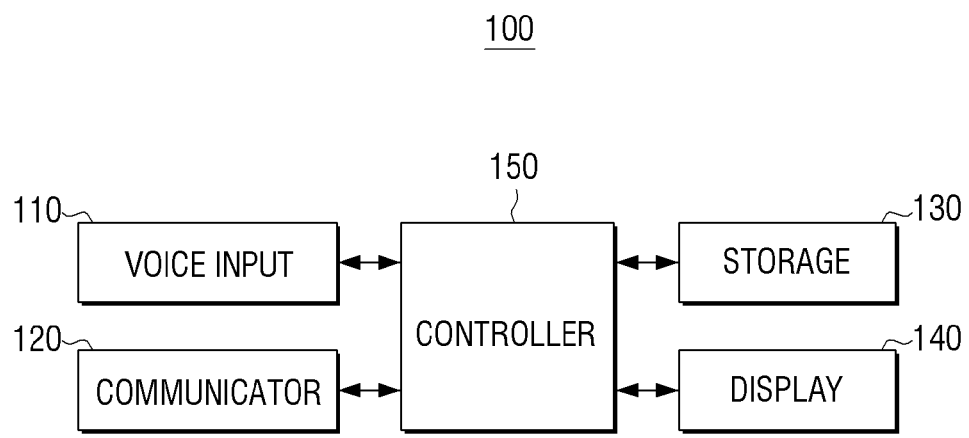
FIG. 2 is a block diagram of a display apparatus, according to an exemplary embodiment.

Hereinafter, the display apparatus 100 will be explained in more detail with reference to FIGS. 2-7. FIG. 2 is a block diagram of a display apparatus 100 according to an exemplary embodiment. The display apparatus 100 comprises a voice input unit 110, a communicator 120, a storage 130, a display 140 and a controller 150.

FIG. 2 is an overall view of various constitutional elements of the display apparatus 100 by suggesting an example in which the display apparatus 100 comprises various functions such as a voice recognition function, a communication function and a display function. Accordingly, depending on exemplary embodiments, some of the constitutional elements in FIG. 2 may be omitted or changed, or other constitutional elements may be added as would be understood by one of ordinary skill in the art.

The voice input 110 receives an audio signal including a user's voice, processes the audio signal and generates a user's voice signal. The voice input 110 may be formed in the main body of the display apparatus 100, but this is merely one example. The voice input 110 may be formed at the outside of the main body (e.g. a remote controller or a separate microphone). In response to the voice input 110 being provided at the outside of the main body, the voice input unit 110 may transmit the generated user's voice signal via a wireless/wired interface (e.g. WiFi, Bluetooth®, etc.) to the main body of the display apparatus 100.

Figure 3:
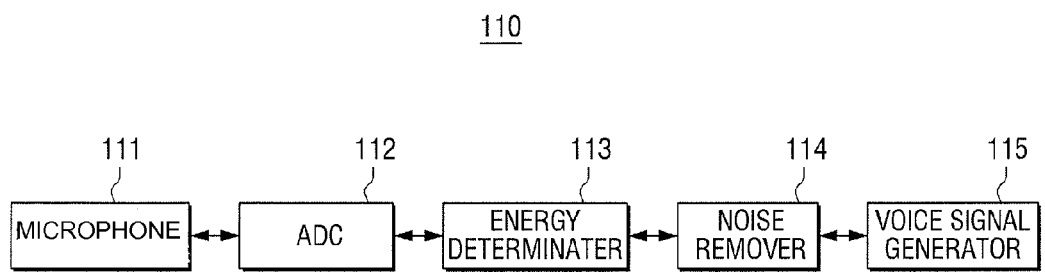
FIG. 3 is a block diagram of a voice input, according to an exemplary embodiment.
Figure 4:
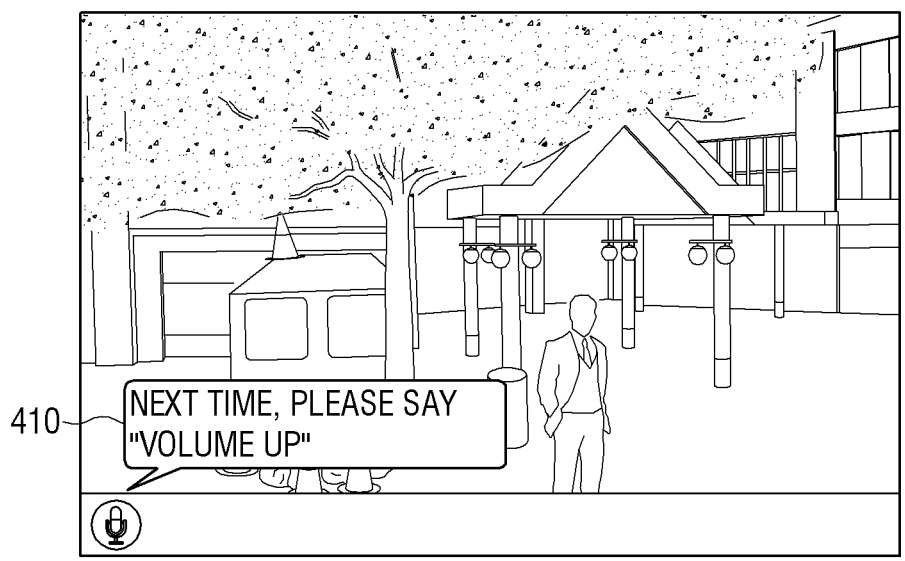
FIGS. 4-7 are views which show guide information, according to various exemplary embodiments.

It will be explained with reference to FIG. 3 how the voice input 110 receives the audio signal including the user's voice and generates the user's voice signal. FIG. 3 is a block diagram of a voice input according to an exemplary embodiment. As described in FIG. 3, the voice input 110 comprises a microphone 111, an analog-digital converter (ADC) 112, an energy determinator 113, a noise remover 114 and a voice signal generator 115.

The microphone 111 receives an analog audio signal including a user's voice.

The ADC 112 converts the multi-channel analog signal input from the microphone into a digital signal.

The energy determinator 113 calculates an energy of the converted digital signal and determines whether the energy of the digital signal is greater than or equal to a predetermined value. In response to the energy of the digital signal being greater than or equal to the predetermined value, the energy determinator 113 transmits the input digital signal to the noise remover 114, and in response to the energy of the digital signal being less than the predetermined value, the energy determinator 113 does not output the input digital signal to the outside but waits for other input. Thus, since the whole audio process is not activated by a sound which is not a voice signal, unnecessary power consumption can be prevented.

In response to the digital signal being input to the noise remover 114, the noise remover 114 removes noise components from the digital signal including the noise component and the user's voice component. A noise component is an unpredicted noise that may, by example be generated under home environment and may be an air conditioner sound, a vacuum cleaner sound or a musical sound. The noise remover 114 outputs the digital signal, from which the noise component is removed, to the voice signal generator 115.

The voice signal generator 115 tracks the user's speaking location within the range of 360° based on the voice input 110 using a localization/speaker tracking module and obtains direction information of the user's voice. The voice signal generator 115 may extract a target sound source within the range of 360° based on the voice input unit 110 by using the digital signal, from which noise is removed, and the direction information of the user's voice through a target spoken sound extraction module, and may generate a voice signal.

As explained above, it is merely an exemplary embodiment to generate a voice signal by removing an unnecessary perimetric noise. A technical idea of the present disclosure may also be applied to an exemplary embodiment of generating a voice signal by determining whether a keyword appears in the user's voice.

Referring back to FIG. 2, the communicator 120 performs a communication with the interactive server 200. In particular, the communicator 120 transmits the user's voice signal generated from the voice input 110 to the interactive server 200 and may receive at least one of the control information and guide information from the interactive server 200. The communicator 120 may be implemented as Ethernet, wireless LAN and WiFi, but this should not be considered as limiting.

The storage 130 stores therein various programs and data which drive the display apparatus 100. In particular, the storage 130 may comprise a voice recognition data base in which a command is matched to control information and is stored.

The display 130 displays image data under a control of the controller 150. In particular, the display 130 may display one of the pre-stored guide information and the guide information received from the interactive server 200.

The controller 150 controls whole operations of the display apparatus 100 according to a user's command. In particular, the controller 150 may control the entire operations of the display apparatus 100 according to the user's voice input via the voice input 110.

In particular, the controller 150 determines whether the user's voice input via the voice input 110 is a pre-stored command in the storage 130. Concurrently, the controller 150 may transmit the user's voice via the communicator 120 to the interactive server 200. For example, in response the user's voice "please volume up" being input via the audio input 110, the controller 150 determines whether the input voice "please volume up" is a pre-stored command. The controller 150 may control the communicator 120 to transmit "please volume up" to the external interactive server 200.

In particular, in response to the user's voice not being a pre-stored command in the storage and when control information which corresponds to the user's voice and the first guide information for guiding a pre-stored command that can perform the same function as the user's voice are transmitted from the interactive server 200, the controller 150 performs the function of the display apparatus 100 according to the transmitted control information and may control the display 120 to display the first guide information. For example, in response to the user's voice being "please volume up" and when control information "increase the audio volume level to a predetermined level" and the first guide information for guiding the command "volume up" pre-stored in the storage 130 that can perform the same function as "please volume up" are received from the interactive server 200, the controller 150 may perform the function of increasing the audio volume level to a predetermined level, and may control the display 120 to display first guide information 410 including the text information "next time, please say volume up" as described in FIG. 4.

However, in response to the user's voice being a command which is pre-stored in the storage 130, the controller 150 searches control information which corresponds to the command stored in the storage 130 and may perform a function of the display apparatus according to the searched control information. For example, in response to the user's voice input via the voice input 110 being "volume up," the controller 150 searches the control information "increase the audio volume level to a predetermined level" which corresponds to the input user's voice "volume up" and may perform the function of increasing the audio volume level to a predetermined level according to the searched control information. Even though control information is received from the external interactive server 200, the controller 150 may preferentially perform a function of the display apparatus 100 according to the embedded command.

Figure 5:
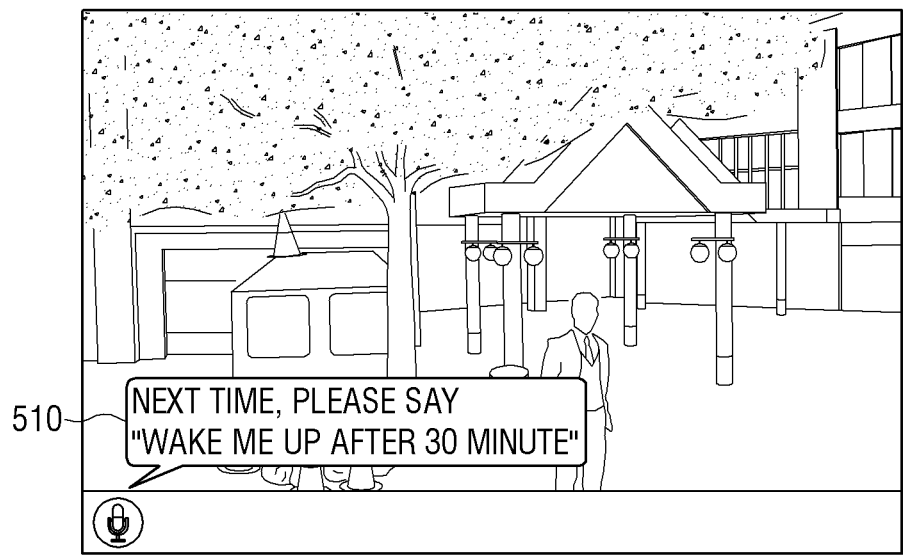
Figure 6:
Figure 7:

In addition, in response to the user's voice input via the voice input 110 being a command stored in the storage 130 and a user's voice is a command for controlling the function of the display apparatus having a plurality of hierarchy structures, the controller 150 may control the display 120 to display second guide information which guides an interactive command that can perform the same function as the user's voice. For example, in response to a first-step user's voice "setting sleep" being input from a user in order to set a sleep function of the display apparatus 100 using a pre-stored command, the controller 150 displays a menu for setting sleep, and in response to a second-step user's voice "30 minutes" being input from the user, the controller 150 may perform a function of powering off the display apparatus 100 after 30 minutes. In other words, in response to the function of the display apparatus having a plurality of hierarchy structures being performed using a pre-stored command, a user has the inconvenience of inputting a voice of plurality of times. However, in response to a user's voice "wake me up after 30 minutes" in an interactive form being input, the controller 150 may perform the same function as an input of a plurality of user's voices using the interactive server 200. Namely, in response to the function of the display apparatus having a plurality of hierarchy structures being performed, the controller 150 may control the display 120 to display the second guide information 510 which guides an interactive command as depicted in FIG. 5 so that the function of the display apparatus 100 can be performed by a single user's voice.

In addition, in response to the user's voice input via the voice input 110 not being a dialog pattern stored in the interactive server 200, and when third guide information is received from the interactive server 200, the third guide information guiding the user's voice according to the dialog pattern stored in the interactive server 200 that performs the same function as the user's voice, the controller 150 may control the display 120 in order to display the third guide information. For example, in response to the user's voice "change channel" being input, and when the third guide information which guides the user's voice "please change the channel to ABC," which is a command having a dialog pattern stored in the interactive server 200, is transmitted from the interactive server 200, the controller 150 may control the display 120 to display the third guide information 610, as described in FIG. 6.

Or, in response to the user's voice input via the voice input 110 being an interactive voice to which the interactive server 200 cannot respond, and when fourth guide information which guides information related to the keyword included in the user's voice being transmitted from the interactive server 200, the controller 150 may control the display 120 to display the fourth guide information. For example, in response to the user's voice "how is Yoo Jae Seok" being input via the voice input 110, the interactive server 200 cannot generate response information via the input user's voice, and thus the interactive server 200 may extract the keyword "Yoo Jae Seok," generate fourth guide information which guides information related to the extracted keyword (for example, his job and his works) and transmit the same to the display apparatus 100. In response to the fourth guide information being transmitted from the interactive server 200, the controller 150 may control the display 120 to display the fourth guide information 710 as in FIG. 7. As another example, in response to the user's voice "shall we go to a delicious restaurant" is input via the voice input 110, the interactive server 200 cannot generate response information via the input user's voice, and thus the interactive server 200 may extract the keyword "delicious restaurant," generate fourth guide information for guiding information related to the extracted keyword (for example, today recommended restaurant) and transmit the same to the display apparatus 100.

The fourth guide information 710 may include a message requiring an input of a new user's voice as well as information related to the keyword.

Due to the display apparatus 100, as explained above, a user can more effectively and rapidly control the display apparatus 100 based on voice recognition.

Figure 8:
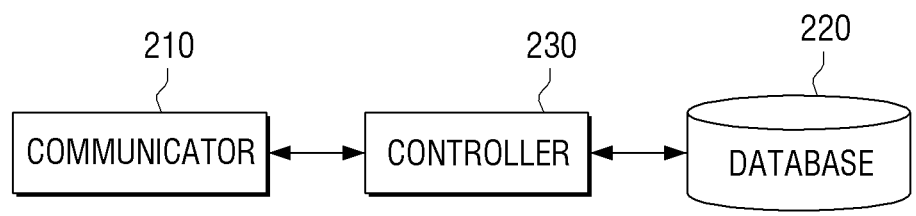
FIG. 8 is a block diagram of an interactive server, according to an exemplary embodiment.

FIG. 8 is a block diagram of an interactive server 200 according to an exemplary embodiment. As described in FIG. 8, the interactive server 200 comprises a communicator 210, database 220 and a controller 230.

The communicator 210 performs a communication with the display apparatus 100. In particular, the communicator 210 receives a user's voice signal from the display apparatus 100 and may transmit at least one of the control information and guide information to the display apparatus 100. The communicator 210 may perform a communication with the display apparatus 100 according to a communication scheme such as Ethernet, wireless LAN and WiFi.

The database 220 stores various data to control the function of the display apparatus 100 using an interactive voice or search contents. In particular, the database 9220) may store such information as a user's voice history information and EPG information. In addition, the database 22 may match the user's voice to the control information and store the same.

In addition, the database 220 may store similar commands as the commands pre-stored in the display apparatus 100 so that the interactive server 200 can provide the first guide information, as in Table 1.

TABLE 1

| Commands pre-stored in the display apparatus | Similar commands |
|---|---|
| volume up | make volume high, make volume loud, increase volume, make sound loud, make sound high, please make volume loud |
| remove sound | turn off sound, turn off volume |

The controller 230 controls the entire operations of the interactive server 200).

In particular, in response to the user's voice being received from the display apparatus 100, the controller 230 searches control information which corresponds to the user's voice. In particular, the controller 230 converts the user's voice into text information and may classify the speaking elements of the user's voice. The controller 230 determines, based on the speaking elements, whether the user's voice is for controlling the function of the display apparatus 100 or is for searching the contents. In response to the user's voice being used to control the function of the display apparatus 100, the controller 230 may search control information which corresponds to the user's voice, based on the database 220.

The controller 230 determines whether there is a pre-stored command in the display apparatus 100 that can perform the same function as control information while searching control information which corresponds to the user's voice. In response to there being a pre-stored command in the display apparatus 100 that can perform the same function as control information, the controller 230 may generate first guide information which guides the pre-stored command and may control the communicator 210 to transmit the first guide information with the control information to the display apparatus 100. For example, in response to the user's voice being "make volume high," the controller 230 may search a pre-stored command in the display apparatus 100 that can perform the same function as "make volume high" and may generate first guide information which guides the command "volume up" pre-stored in the apparatus 100 that performs the same function as "make volume high."

In addition, in response to the user's voice transmitted from the display apparatus 100 not being a dialog pattern stored in the interactive server 200, the controller 230 may control the communicator 210 to generate the third guide information and transmit the information to the display apparatus, wherein the third guide information guides the user's voice according to the dialog pattern stored in the interactive server 200 that performs the same function as the user's voice. For example, in response to the user's voice "change channel" being input, the controller 230 determines that the user's voice is not a pattern stored in the database 220. The controller 230 may generate the third guide information which guides the user's voice "please change the channel to ABC" so as to induce a user to speak in accordance with the dialog pattern stored in the database 220.

In response to the user's voice transmitted from the display apparatus 100 being an interactive voice to which the interactive server 200 cannot respond, the controller 230 may extract a keyword from the interactive user's voice, generate the fourth guide information which guides information related to the keyword and control the communicator 210 to transmit the information to the display apparatus 100.

For example, in response to the user's voice "how is Yoo Jae Seok" being transmitted from the display apparatus 100, the controller 230 cannot generate response information via the input user's voice, and thus the controller 230 may extract the keyword "Yoo Jae Seok" from the user's voice, generate fourth guide information for guiding information related to the extracted keyword (for example, his job and his works) and transmit the same to the display apparatus 100. As another example, in response to the user's voice "shall we go to a restaurant" being transmitted from the display apparatus 100, the controller 230 cannot generate response information via the input user's voice, and thus the controller 230 may extract the keyword "restaurant" from the user's voice, generate fourth guide information which guides information related to the extracted keyword (for example, today's recommended restaurant) and transmit the same to the display apparatus 100.

As explained above, the interactive server 200 provides various types of guide information so that a user can more effectively and rapidly control the function of the display apparatus 100 using voice recognition.

Figure 9:
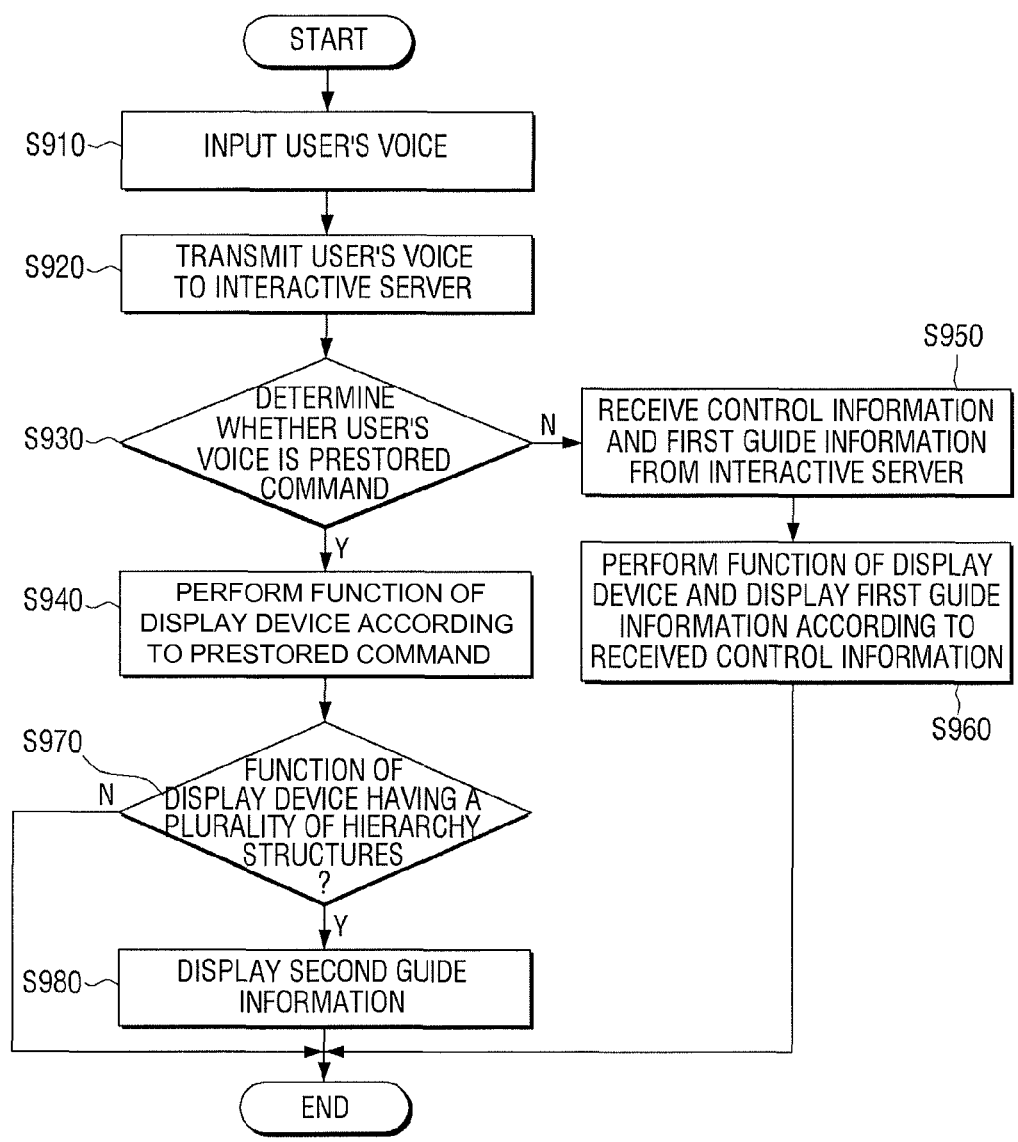
FIG. 9 is a flow chart which explains a method of controlling a display apparatus, according to an exemplary embodiment.

FIG. 9 is a flow chart which explains a method of controlling a display apparatus 100, according to an exemplary embodiment.

A display apparatus receives a user's voice (S910). The user's voice may be a command which controls the function of the display apparatus 100, such as volume control, channel control and power control.

The display apparatus 100 transmits the user's voice to the interactive server 200 (S920).

The display apparatus 100 determines whether the user's voice is a pre-stored command (S930). S920 and S930 may be performed at the same time.

In response to the user's voice being a pre-stored command (S930-Y), the display apparatus 100 performs the function of the display apparatus 100 according to the pre-stored command (S940).

In response to the user's voice not being a pre-stored command (S930-N), the display apparatus 100 receives control information and first guide information from the interactive server 200 (S950). The first guide information may guide a pre-stored command in the display apparatus 100 that performs the same function as the user's voice.

The display apparatus 100 performs the function of the display apparatus according to the received control information and displays the first guide information (S960).

In response to the function of the display apparatus 100 being performed according to the pre-stored command, the display apparatus 100 determines whether the function is that of the display apparatus 100 having a plurality of hierarchy structures (S970).

In response to the function being that of the display apparatus 100 having a plurality of hierarchy structure (S970-Y), the display apparatus 100 displays the second guide information (S980). The second guide information may guide an interactive command that performs the same function as the user's voice and can use the interactive server 200.

Figure 10:
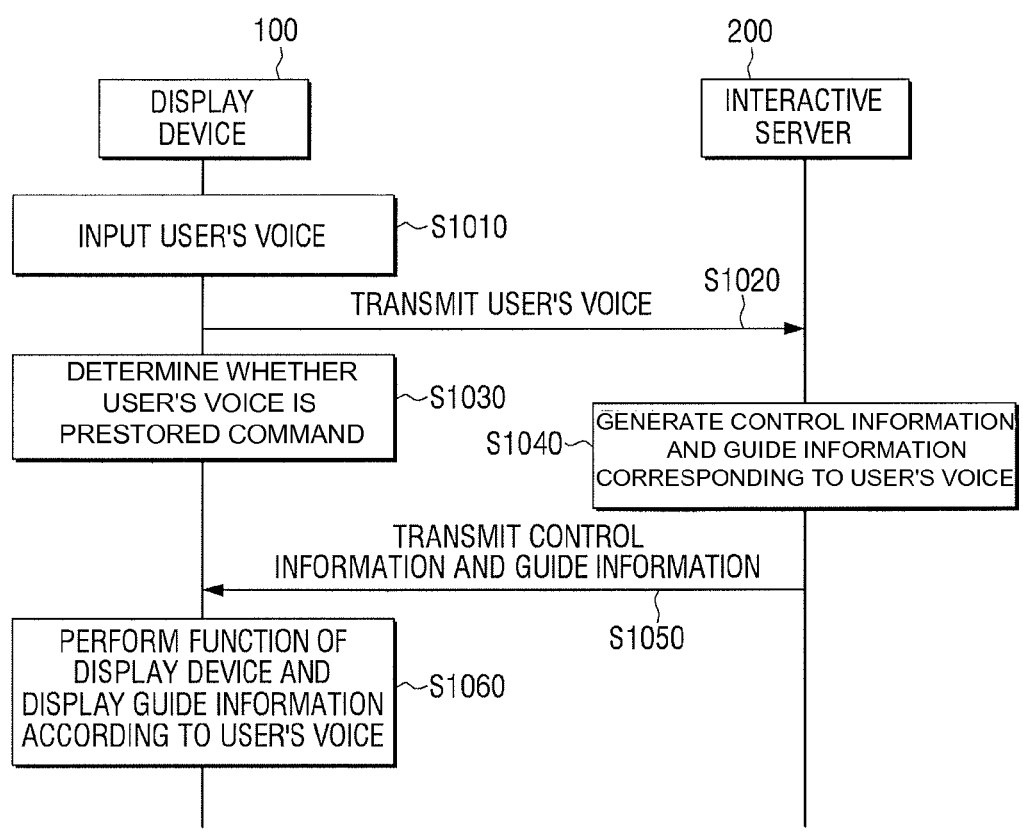
FIG. 10 is a sequence diagram which explains a method of controlling a display apparatus of a voice recognition system, according to an exemplary embodiment.

FIG. 10 is a sequence diagram which explains a method of controlling a display apparatus of a voice recognition system according to an exemplary embodiment.

The display apparatus 100 receives the user's voice (S1010).

The display apparatus 100 transmits the user voice to the interactive server (S1020). The display apparatus 100 determines whether the user's voice is a pre-stored command (S1030).

The interactive server 200 generates control information which corresponds to the user's voice and guide information (S1040). In particular, the interactive server 200 may generate control information which corresponds to the user's voice by analyzing the speaking elements of the user's voice and may generate various kind of guide information according to the type of the user's voice. For example, in response to the user's voice not being a pre-stored command in the display apparatus 100, the interactive server 200 may generate first guide information which guides a pre-stored command in the display apparatus that can perform the same function as the user's voice. Or, in response to the user's voice not being a pattern stored in the interactive server 200, the interactive server 200 may generate third guide information which guides the user's voice that performs the same function as the user's voice and follows the dialog pattern stored in the interactive server. In response to the user's voice being an interactive voice, to which the interactive server 200 cannot respond, the interactive server 200 may extract the keyword from the user's voice and may generate fourth guide information related to the keyword.

The interactive server 200 transmits the control information and the guide information to the display apparatus 100 (S1050).

The display apparatus 100 performs the function of the display apparatus according to the user's voice and displays guide information (S1060). In particular, the display apparatus 100 may perform the function of the display apparatus 100 using different control information depending on whether the user's voice is a pre-stored command. In response to the user's voice being a pre-stored command, the display apparatus 100 may search control information which corresponds to the pre-stored command and may perform the function of the display apparatus 100 according to the searched control information. However, in response to the user's voice not being a pre-stored command, the display apparatus 100 may perform the function of the display apparatus 100 according to the control information transmitted from the interactive server 200. In addition, the display apparatus 100 may display guide information 410, 510, 610, 710 as explained in FIGS. 4-7 so that a user can more effectively and rapidly perform voice recognition.

As set forth above, the present disclosure provides guide information which provides effective voice recognition so that a user can more effectively and rapidly perform the function of the display apparatus.

Figure 11:
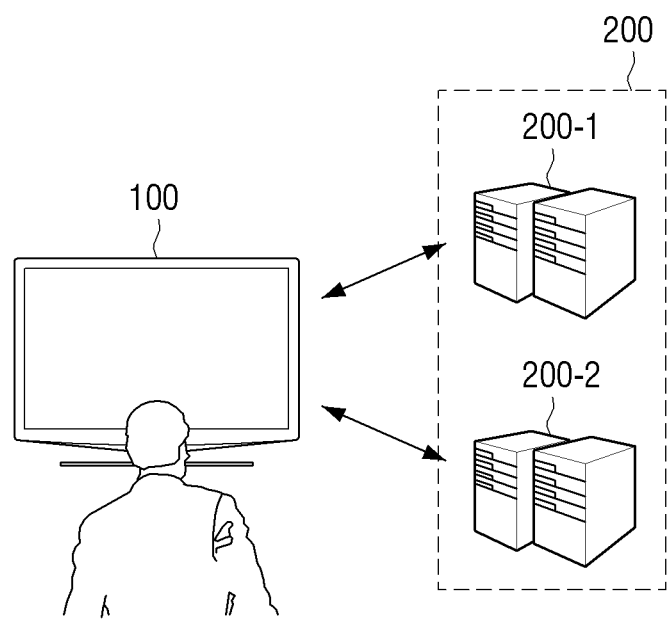
FIG. 11 is a view of a voice recognition system, according to another exemplary embodiment.

In the above exemplary embodiments, it has been explained that the interactive server 200 is implemented as a single server. However, this is merely an exemplary embodiment, and the interactive server may be implemented as a plurality of servers. For example, the interactive server 200 may comprise a first interactive server 200-1 which converts the user voice into text information, and a second interactive server 200-2 which generates control information and first guide information based on the text information, as described in FIG. 11. The display apparatus 100 may transmit the user's voice to the first interactive server 200-1 and may transmit the text information transmitted from the first interactive server 200-1 to the second interactive server 200-2. The second interactive server 200-2 may generate, based on the transmitted text information, at least one of the control information and the guide information, as explained in FIG. 8.

A program code for performing the control method according to various embodiments may be stored in a non-transitory computer readable storage medium. The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk®, a universal serial bus (USB) memory stick, a memory card, and a read only memory (ROM), and may be provided.

The aforementioned method of displaying UI may be implemented as a program including an algorithm executable in a computer, and the program may be provided by being stored in a non-transitory computer readable storage medium.

Although a few embodiments of the present disclosure have been shown and described, it will be appreciated by those skilled in the art that changes may be made in these exemplary embodiments without departing from the principles and spirit of the invention, the scope of which is defined in the appended claims and their equivalents.

What is claimed is:

1. A method of controlling a display apparatus, the method comprising:
    receiving a user's voice to be used to control the display apparatus;
    transmitting the user's voice to an interactive server while determining whether the user's voice is a pre-stored command in the display apparatus;
    in response to determining that the user's voice corresponds to the pre-stored command in the display apparatus, performing a function of the display apparatus according to the pre-stored command; and
    in response to determining that the user's voice is not the pre-stored command in the display apparatus, performing a function corresponding to control information received from the interactive server corresponding to the user's voice, and displaying first guide information which guides the pre-stored command capable of performing the same function as the user's voice,
    wherein the first guide information is received from the interactive server, and
    wherein the user's voice is transmitted to the interactive server regardless of whether the user's voice corresponds to the pre-stored command.

2. The method of claim 1, wherein the interactive server searches control information which corresponds to the user's voice;
    determines whether there is a pre-stored command in the display apparatus that can perform the same function as the control information, while searching the control information which corresponds to the user's voice; and
    in response to there being the pre-stored command in the display apparatus that can perform the same function as the control information, generates the first guide information which guides the pre-stored command and transmits the first guide information with the control information to the display apparatus.

3. The method of claim 1, further comprising:
    in response to the user's voice being a pre-stored command, searching control information which corresponds to the pre-stored command; and
    performing a function of the display apparatus based on the searched control information.

4. The method of claim 3, further comprising:
    when the user's voice is a pre-stored command and the user's voice is a command which controls the function of the display apparatus having a plurality of hierarchy structures, displaying second guide information which guides an interactive command capable of performing the same function as the user's voice.

5. The method of claim 1, wherein the interactive server comprises a first interactive server which converts the user's voice into text information; and a second interactive server which generates control information and the first guide information based on the text information.

6. A display apparatus comprising:
    a voice input configured to receive a user's voice to be used to control the display apparatus;
    a communicator configured to communicate with an interactive server;

a storage configured to match a command and control information in order to store the same;

a display; and a controller configured to transmit the user's voice via the communicator to the interactive server while determining whether the user's voice input via the user input is a pre-stored command, in response to determining that the user's voice corresponds to a pre-stored command in the display apparatus, perform a function of the display apparatus according to the pre-stored command, in response to determining that the user's voice is not the pre-stored command in the storage, perform a function of the display apparatus corresponding to control information received from the interactive server, and control the display to display first guide information guiding the pre-stored command capable of performing the same function as the user's voice, wherein the first guide information is received from the interactive server, and wherein the user's voice is transmitted to the interactive server regardless of whether the user's voice is a pre-stored command.

7. The display apparatus of claim 6, wherein the interactive server searches control information which corresponds to the user's voice;

determines whether there is a pre-stored command in the display apparatus that can perform the same function as the control information, while searching the control information which corresponds to the user's voice; and when there is a pre-stored command in the display apparatus that can perform the same function as the control information, generates the first guide information which guides the pre-stored command and transmits the first guide information, to the display apparatus along with the control information.

8. The display apparatus of claim 6, wherein the controller searches control information which corresponds to the user's voice pre-stored in the storage when the user's voice is a command pre-stored in the storage, and performs a function of the display apparatus based on the searched control information.

9. The display apparatus of claim 8, wherein the controller controls the display in order to display second guide information which guides an interactive command performing the same function as the user's voice, when the user's voice is a pre-stored command and the user's voice is a command for controlling the function of the display apparatus having a plurality of hierarchy structures.

10. The display apparatus of claim 6, wherein the interactive server comprises a first interactive server which converts the user's voice into text information; and a second interactive server generating control information and the first guide information based on the text information, and the controller transmits the user's voice to the first interactive server and controls the communicator to transmit the text information from the first interactive server to the second interactive server.

11. A method of controlling a voice recognition system comprising an interactive server and a display apparatus, the method comprising:

receiving a user's voice by the display apparatus;

transmitting, by the display apparatus the user's voice via a communicator to the interactive server while determining whether the user's voice input via the user input is a pre-stored command;

in response to determining that the user's voice corresponds to a pre-stored command in the display apparatus, performing a function of the display apparatus according to the pre-stored command; and in response to determining that the user's voice is not a pre-stored command in the display apparatus, performing, by the display apparatus a function based on control information received from the interactive server, and displaying first guide information guiding a pre-stored command in the display apparatus that can perform the same function as the control information, wherein the first guide information is received from the interactive server, and wherein the user's voice is transmitted to the interactive server regardless of whether the user's voice is a pre-stored command.

12. The method of claim 11, further comprising:

in response to the user's voice being a pre-stored command in the display apparatus, the display apparatus searches, control information which corresponds to the user's voice and performs a function of the display apparatus based on the searched control information.

13. The method of claim 12, further comprising:

in response to the user's voice being a pre-stored command and the user's voice is a command which controls the function of the display apparatus having a plurality of hierarchy structures, the display apparatus displays second guide information which guides an interactive command which performs the same function as the user's voice.

14. The method of claim 11, wherein the interactive server comprises a first interactive server which converts the user's voice into text information; and a second interactive server which generates control information and the first guide information based on the text information, and the transmitting the user's voice comprises:

converting the user's voice into a digital signal by the display apparatus;

transmitting the digital signal to the first interactive server by the display apparatus;

generating text information which corresponds to the digital signal and transmitting the text information to the display apparatus by the first interactive server; and transmitting the text information to the second interactive server by the display apparatus.

15. The method of claim 11, wherein the transmitting information further comprises:

in response to the user's voice not being a dialog pattern pre-stored in the interactive server, performing the same function as the user's voice, generating third guide information and transmitting the third guide information to the display apparatus, the third guide information guide guiding a user's voice according to the dialog pattern pre-stored in the interactive server by the interactive server; and displaying the third guide information by the display apparatus.

16. The method of claim 11, wherein the transmitting information further comprises:

in response to the user's voice being an interactive voice to which the interactive server cannot respond, generating, by the interactive server, fourth guide information by extracting a keyword from the user's voice and transmitting the fourth guide information to the display apparatus, the fourth guide information guiding information related to the keyword; and displaying, by the display apparatus, the fourth guide information.

17. A display apparatus comprising:

a communicator configured to communicate with an interactive server;

a storage configured to match a command and control information in order to store the same; and a controller configured to transmit the user's voice via the communicator to the interactive server while determining whether the user's voice input via a user input is a pre-stored command, in response to determining that the user's voice corresponds to a pre-stored command in the display apparatus, perform a function of the display apparatus according to the pre-stored command, in response to determining that the user's voice is not a pre-stored command, perform a function of the display apparatus corresponding to the control information received from the interactive server, and control a display of first guide information guiding the pre-stored command capable of performing the same function as the user's voice, wherein the first guide information is received from the interactive server, and wherein the user's voice is transmitted to the interactive server regardless of whether the user's voice is a pre-stored command.

18. The display apparatus of claim 17, further comprising a voice input configured to receive a user's voice to be used to control the display apparatus.

19. The display apparatus of claim 17 further comprising a display to display the first guide information.

20. The display apparatus of claim 17, wherein the controller searches control information which corresponds to the user's voice pre-stored in the storage when the user's voice is a command pre-stored in the storage, and performs a function of the display apparatus based on the searched control information.

* * * * *